United States Patent
Oota et al.

[11] Patent Number: 6,125,954
[45] Date of Patent: Oct. 3, 2000

[54] CONTINUOUSLY SHIFTING-TYPE STEERING SYSTEM

[75] Inventors: Yoshitaka Oota; Jitsumi Hanafusa; Tomoaki Ishikawa, all of Wako, Japan

[73] Assignee: Honda Giken Kogyo Kabushiki Kaisha, Tokyo, Japan

[21] Appl. No.: 08/934,024

[22] Filed: Sep. 19, 1997

[30] Foreign Application Priority Data

Sep. 20, 1996  [JP]  Japan .................................. 8-249827

[51] Int. Cl.[7] .................................................. B62D 11/10
[52] U.S. Cl. ........................ 180/6.48; 180/6.7; 180/308; 475/24; 475/83
[58] Field of Search .................................. 180/6.48, 6.2, 180/6.7, 6.44, 9.44, 307, 308; 417/379, 380; 475/23, 24, 32, 73, 83; 60/484, 485

[56] References Cited

U.S. PATENT DOCUMENTS

| | | | |
|---|---|---|---|
| 3,398,605 | 8/1968 | Ainsworth et al. | 475/24 |
| 3,503,278 | 3/1970 | Livezey | 475/24 |
| 3,538,790 | 11/1970 | Polak | 475/24 |
| 3,988,893 | 11/1976 | Bojas et al. | 180/6.48 |
| 4,132,278 | 1/1979 | Todeschini | 180/6.48 |
| 4,310,078 | 1/1982 | Shore | 180/6.48 |
| 4,527,649 | 7/1985 | Mauldin | 180/6.48 |
| 4,917,200 | 4/1990 | Lucius | 180/6.2 |
| 5,078,222 | 1/1992 | Hauser et al. | 180/308 |
| 5,168,946 | 12/1992 | Dorgan | 180/6.44 |
| 5,390,751 | 2/1995 | Puetz et al. | 180/6.48 |
| 5,850,886 | 12/1998 | Kouno et al. | 180/307 |

FOREIGN PATENT DOCUMENTS

7-132743  5/1995  Japan .

*Primary Examiner*—Anne Marie Boehler
*Attorney, Agent, or Firm*—Arent, Fox, Kintner, Plotkin & Kahn

[57] ABSTRACT

A continuously shifting-type steering system includes a pair of left and right hydrostatic continuously variable transmissions each of which is comprised of a hydraulic pump and a hydraulic motor, and a pair of left and right planetary gear mechanisms each having a first sun gear, a second sun gear, a two-step planetary gear and a carrier. A first driving gear connected to an engine, is operably connected commonly to the left and right first sun gears. Left and right second driving gears secured to motor shafts of the left and right hydraulic motors, are operably connected to the left and right carriers, respectively. Left and right output shafts are operably connected to the left and right second sun gears, respectively. Thus, it is possible to provide an increase in the shifting range of the continuously shifting-type steering system, and an enhancement in low-output performance.

3 Claims, 13 Drawing Sheets

CONTINUOUSLY SHIFTING-TYPE STEERING SYSTEM

BACKGROUND OF THE INVENTION

1. Field of the Invention

The present invention relates to a continuously shifting-type steering system used for driving left and right driving wheels and for a differential steering of the driving wheels in an unleveled-ground working vehicle, a snow vehicle or other type of vehicle. In particular, the present invention is directed to an improvement in a continuously shifting-type steering system including a pair of left and right hydrostatic continuously variable transmissions each of which comprises a hydraulic pump and a hydraulic motor connected to each other through a closed hydraulic pressure circuit and which is capable of being individually shifted. Pump shafts of the left and right hydraulic pumps are synchronously driven by an engine, and a pair of output shafts connected to the left and right driving wheels are individually driven from the motor shafts of the left and right hydraulic motors.

2. Description of the Related Art

Such a continuously shifting-type steering system is already known, for example, as disclosed in Japanese Patent Application Laid-open No. 7-132743.

In the hydrostatic continuously variable transmission in such continuously shifting-type steering system, the capacity or displacement of the hydraulic pump is variable for the purpose of shifting the continuously variable transmission, so that the forward speed ratio is controlled by regulating the capacity of the hydraulic pump from zero to a positive maximum value. The shifting range is however, not sufficient. When a small-sized hydrostatic continuously variable transmission is employed, it is difficult to transmit larger power in a lower-speed range, due to the flow path resistance to the working oil and for this reason, the lower-speed output performance must be lowered.

SUMMARY OF THE INVENTION

Accordingly, it is an object of the present invention to provide a continuously shifting-type steering system which is capable of providing a sufficient shifting range and exhibiting high lower-speed, output performance, even if a small-sized hydrostatic continuously variable transmission is used.

To achieve the above object, according to a first aspect and feature of the present invention, there is provided a continuously shifting-type steering system comprising a pair of left and right hydrostatic continuously variable transmissions, each of which is comprised of a hydraulic pump and a hydraulic motor connected to each other through a closed hydraulic pressure circuit and which is capable of being individually shifted. The pump shafts of the left and right hydraulic pumps are synchronously driven by an engine, and a pair of output shafts connected to the left and right driving wheels are individually driven by the motor shafts of the left and right hydraulic motors. The steering system further includes a pair of left and right planetary gear mechanisms, and a driving member connected to the engine, which member is operably connected commonly to first elements of both the mechanisms, the left and right motor shafts being operably connected to second elements of both the mechanisms, respectively, and the left and right output shafts being operably connected to third elements of both the mechanisms, respectively.

With the first feature of the present invention, a portion of the capacity of a pump swash plate in a negative direction in addition to the capacity of the pump swash plate in a positive direction functions in the control of an overall speed ratio in the positive direction, thereby significantly increasing the overall speed ratio in the positive direction. Moreover, this ensures that even if the hydrostatic continuously variable transmission is in a lower-speed range in which it is difficult to transmit a larger power due to the constriction of the flow of a working oil, the larger power of the engine can be mechanically transmitted with good efficiency from a mechanical transmitting line connecting the driving member to the output shafts. Thus, it is possible to enhance the lower-speed driving performance, and to reduce the size of the hydrostatic continuously variable transmission and thus the size of the hydraulic, continuously shifting-type, steering system. Further, a decrease in leakage of the working oil pressure can be brought about by a decrease in transmitting burden on the hydrostatic continuously variable transmission, thereby further enhancing the transmitting efficiency.

According to a second aspect and feature of the present invention, each of the left and right planetary gear mechanisms is comprised of a first sun gear, a two-step planetary gear with one of gear sections thereof meshed with the first sun gear, a second sun gear disposed coaxially with the first sun gear and meshed with the other gear section of the two-step planetary gear, and a carrier which carries a support shaft of the two-step planetary gear. The driving member is operably connected commonly to the left and right first sun gears, the left and right motor shafts are operably connected to the left and right carriers, respectively. The left and right output shafts are operably connected to the left and right second sun gears, respectively.

With the second feature of the present invention, each of the planetary gear mechanisms does not include a larger-diameter ring gear and hence, the size of the planetary gear mechanism can be reduced.

According to a third aspect and feature of the present invention, each of the left and right planetary gear mechanisms is comprised of a sun gear, a planetary gear meshed with the sun gear, a carrier which carries a support shaft of the planetary gear, and a ring gear disposed concentrically with the sun gear and meshed with the planetary gear. The driving member is operably connected commonly to the left and right sun gears, the left and right motor shafts are operably connected to the left and right ring gears, respectively, and the left and right output shafts are operably connected to the left and right carriers, respectively.

With the third feature of the present invention, each of the planetary gear mechanisms has the larger-diameter ring gear, but the sun gear may be single, and the planetary gear may be a simple one-step type. Thus, it is possible to reduce the axial dimension of the mechanism.

The above and other objects, features and advantages of the invention will become apparent from the following description of the preferred embodiments taken in conjunction with the accompanying drawings.

DETAILED DESCRIPTION OF THE PREFERRED EMBODIMENTS

The present invention will now be described by way of particular embodiments with reference to the accompanying drawings.

Figure 1:
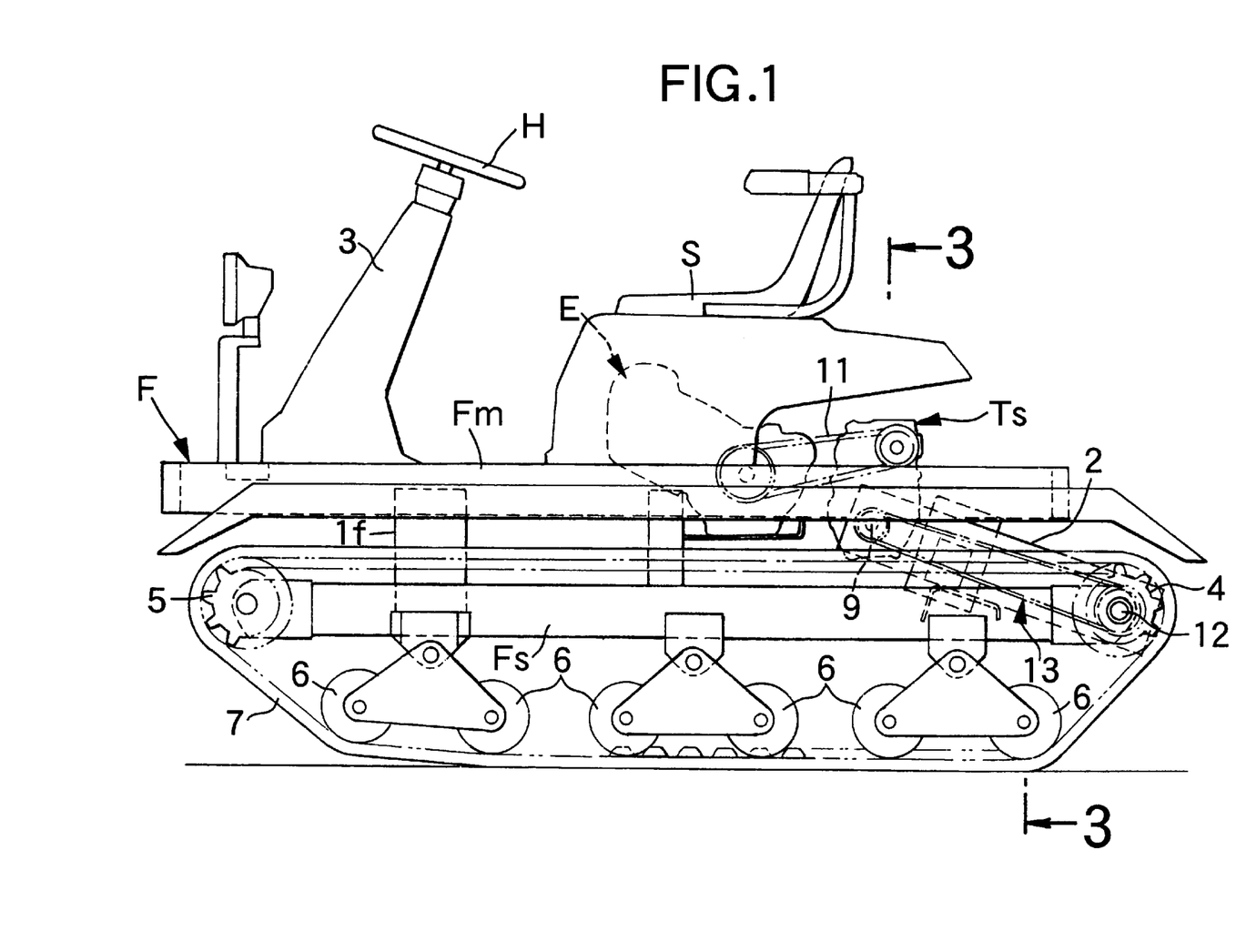
FIG. 1 is a side view of an unleveled-ground working vehicle equipped with a continuously shifting-type steering system according to a first embodiment of the present invention.
Figure 2:
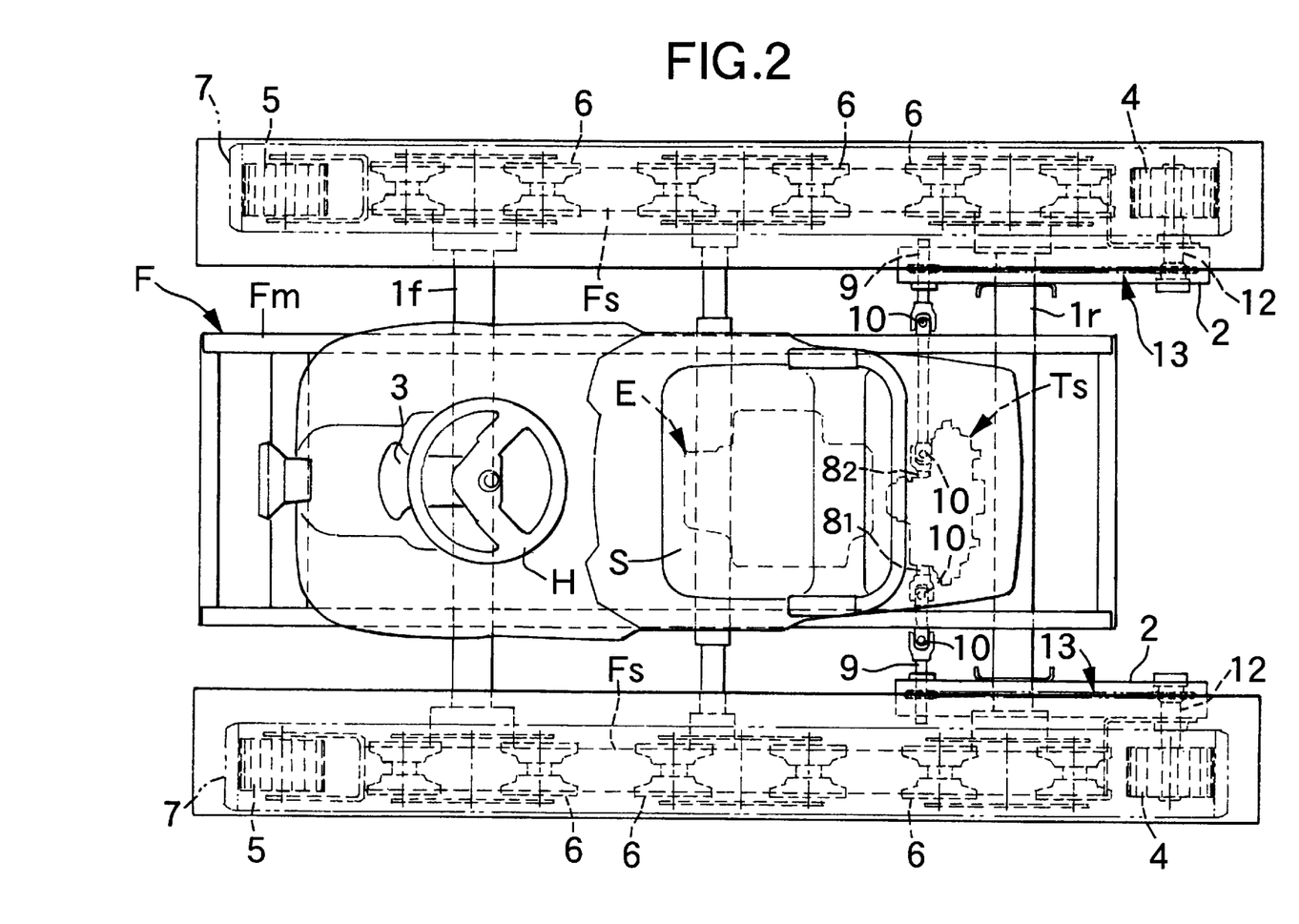
FIG. 2 is a plan view of the unleveled-ground working vehicle.
Figure 3:
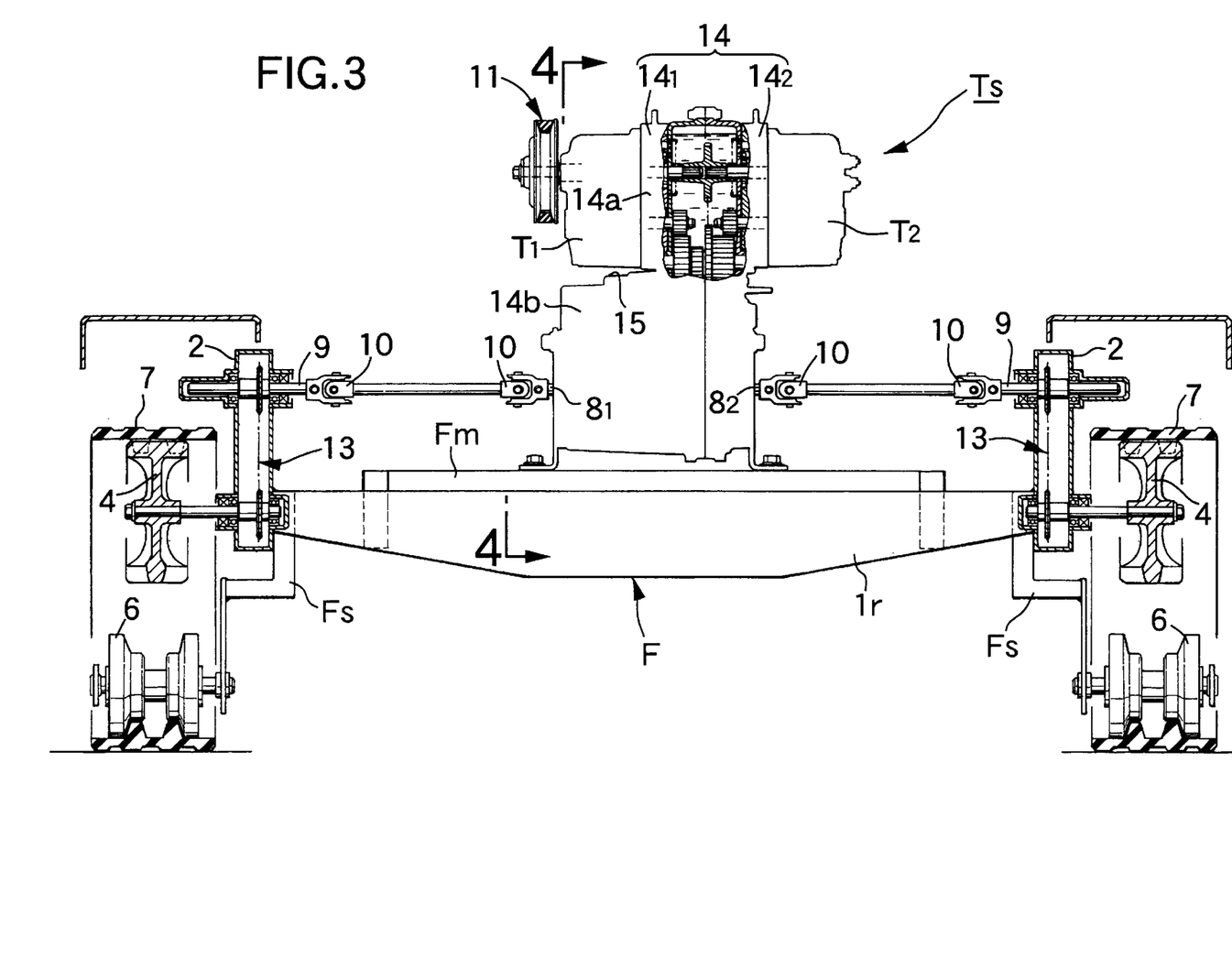
FIG. 3 is a sectional view taken along a line 3—3 in FIG. 1.

A first embodiment of the present invention will be first described with reference to FIGS. 1 to 9. Referring to FIGS. 1 to 3, a frame F of an unleveled-ground working vehicle is comprised of a rectangular main frame section Fm, and a pair of left and right side frame sections Fs, Fs coupled to the main frame section Fm through a pair of front and rear cross members 1f and 1r. A rearwardly declining transmitting case 2 is interposed and fixed between the rear cross member 1r and each of the side frame sections Fs. An engine E and a continuously shifting-type steering system Ts according to the present invention driven from the engine E, are mounted and supported on the main frame section Fm, and a driver's seat S is placed on the main frame covering the engine E. A steering wheel column 3 for supporting a steering wheel H is fixedly mounted in front of the seat S. On each of the side frame sections Fs, a driving wheel 4 is supported at a rear portion thereof, and a follower wheel 5 is supported at a front portion thereof. A plurality of guide wheels 6 are supported at intermediate portions of each of the side frame sections Fs, and a crawler 7 is mounted to cover the driving wheel 4, the follower wheel 5 and the guide wheels 6.

The continuously shifting-type steering system Ts has left and right output shafts $8_1$ and $8_2$ each of which is connected to a driving shaft 9 supported at a front portion of the same-side transmitting case 2 through a pair of left and right hook joints 10, 10. A driven shaft 12 is supported at a lower portion of the transmitting case 2 and is connected to the same-side driving wheel 4. A chain transmitting device 13 interconnecting the driving shaft 9 and the driven shaft 12 is accommodated in the transmitting case 2. Therefore, if the left and right output shafts $8_1$ and $8_2$ are simultaneously rotated, such rotation can be transmitted to the left and right driving wheels 4, 4 through the left and right chain transmitting devices 13, 13, thereby driving the left and right crawlers 7, 7 to drive the vehicle forwards or backwards. By making a difference between the rotational speeds of the left and right output shafts $8_1$ and $8_2$, the left and right crawlers 7, 7 can be differentially driven to steer the vehicle leftwards or rightwards.

The continuously shifting-type steering system Ts includes a transmission case 14 secured to the main frame Fm, and a pair of hydrostatic continuously variable transmissions $T_1$ and $T_2$ mounted on the left and right sides of the transmission case 14. The transmission case 14 is comprised of a left case half $14_1$ and a right case half $14_2$ separated from each other in a plane perpendicular to axes of the output shafts $8_1$ and $8_2$. The left and right case halves $14_1$ and $14_2$ are separately coupled at their opened ends to each other by bolts. A lower half of an outer side of the left case half $14_1$ protrudes substantially outwards with a step 15 formed thereon, whereas outer side of the right case half $14_2$ is formed flat over the entire area. In this manner, the transmission case 14 has a narrower portion 14a in an upper area thereof and a wider portion 14b in a lower area thereof with the step 15 interposed therebetween. The pair of continuously variable transmissions $T_1$ and $T_2$ are mounted to the left and right sides of the narrower portion 14a.

Figure 4:
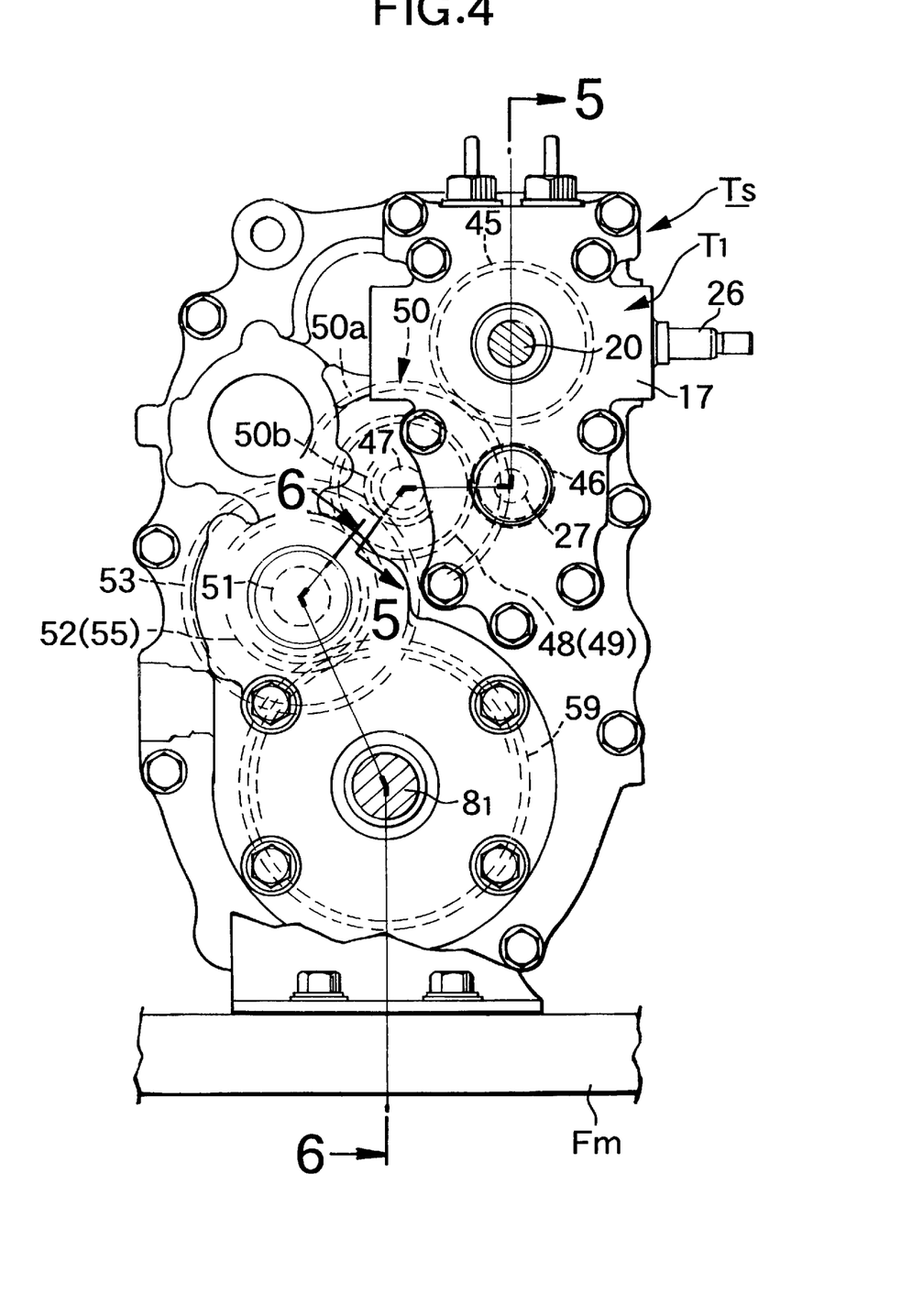
FIG. 4 is a view taken along a line 4—4 in FIG. 3.
Figure 5:
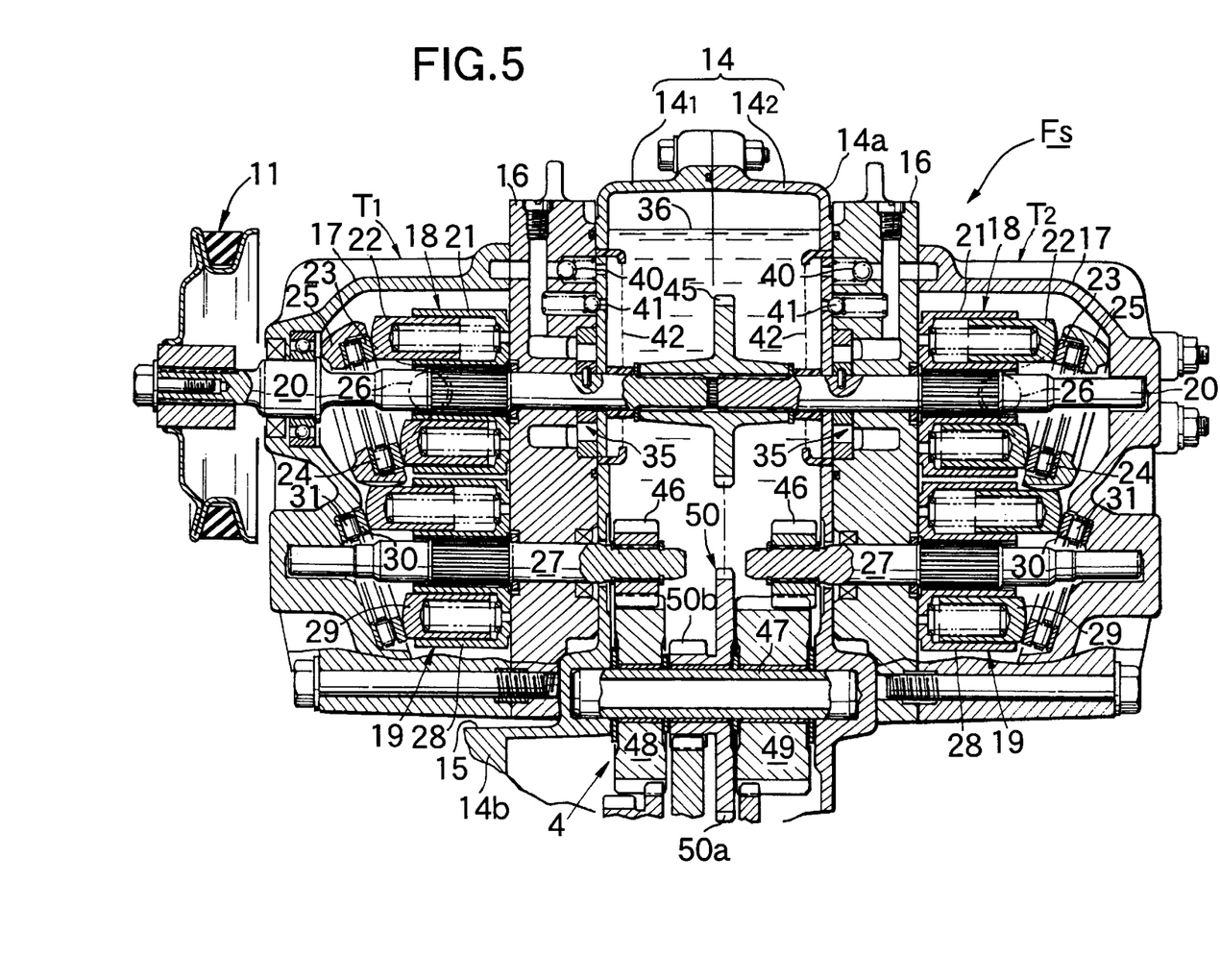
FIG. 5 is a sectional view taken along a line 5—5 in FIG. 4.

As shown in FIGS. 4 and 5, the left and right continuously variable transmissions $T_1$ and $T_2$ have the same structure and are disposed symmetrically. Each of the continuously variable transmissions $T_1$ and $T_2$ includes a dispensing plate 16 separately bolted to the outer side of the corresponding case half $14_1$, $14_2$, a housing 17 bolted to the dispensing plate 16, and a hydraulic pump 18 and a hydraulic motor 19 which are disposed within the housing 17. The hydraulic pump 18 is comprised of a pump shaft 20 extending through the dispensing plate 16 and a pump cylinder 21 spline-coupled to the pump shaft 20 to rotatably and slidably come into close contact with the dispensing plate 16. A large number of pump plungers 22 are slidably fitted in the pump cylinder 21 in an annular arrangement to surround the pump shaft 20, a pump swash plate 23 is in abutment against outer ends of the pump plungers 22, and a swash plate holder 25 supports a back of the pump swash plate 23 through a thrust bearing 24. The swash plate holder 25 is supported at the housing 17 through a pair of trunnion shafts 26 having axes perpendicular to an axis of the pump shaft 20, so that the pump swash plate 23 can be tilted between one of maximum tilted positions (a forward TOP position) and the other maximum tilted position (a backward TOP position) via a righted position (a neutral position) perpendicular to the pump shaft 20. A shifting lever (not shown) is secured to an outer end of the trunnion shaft 26 of each of the left and right swash plate holders 25, and is adapted to be turned in operative association with the operations of the steering wheel H and a control lever (not shown) to regulate the angle of each pump swash plates 23.

The hydraulic motor 19 is comprised of a motor shaft 27 extending through the dispensing plate 16, and a motor cylinder 28 spline-coupled to the motor shaft 27 to rotatably and slidably come into close contact with the dispensing plate 16. A large number of motor plungers 29 are slidably fitted in the motor cylinder 28 in an annular arrangement to surround the motor shaft 27, and a motor swash plate 30 is in abutment against outer ends of the motor plungers 29. The motor swash plate 30 has a rear face supported on the housing 17 through a thrust bearing 31 when it is inclined at a given angle with respect to the motor shaft 27.

Figure 8:
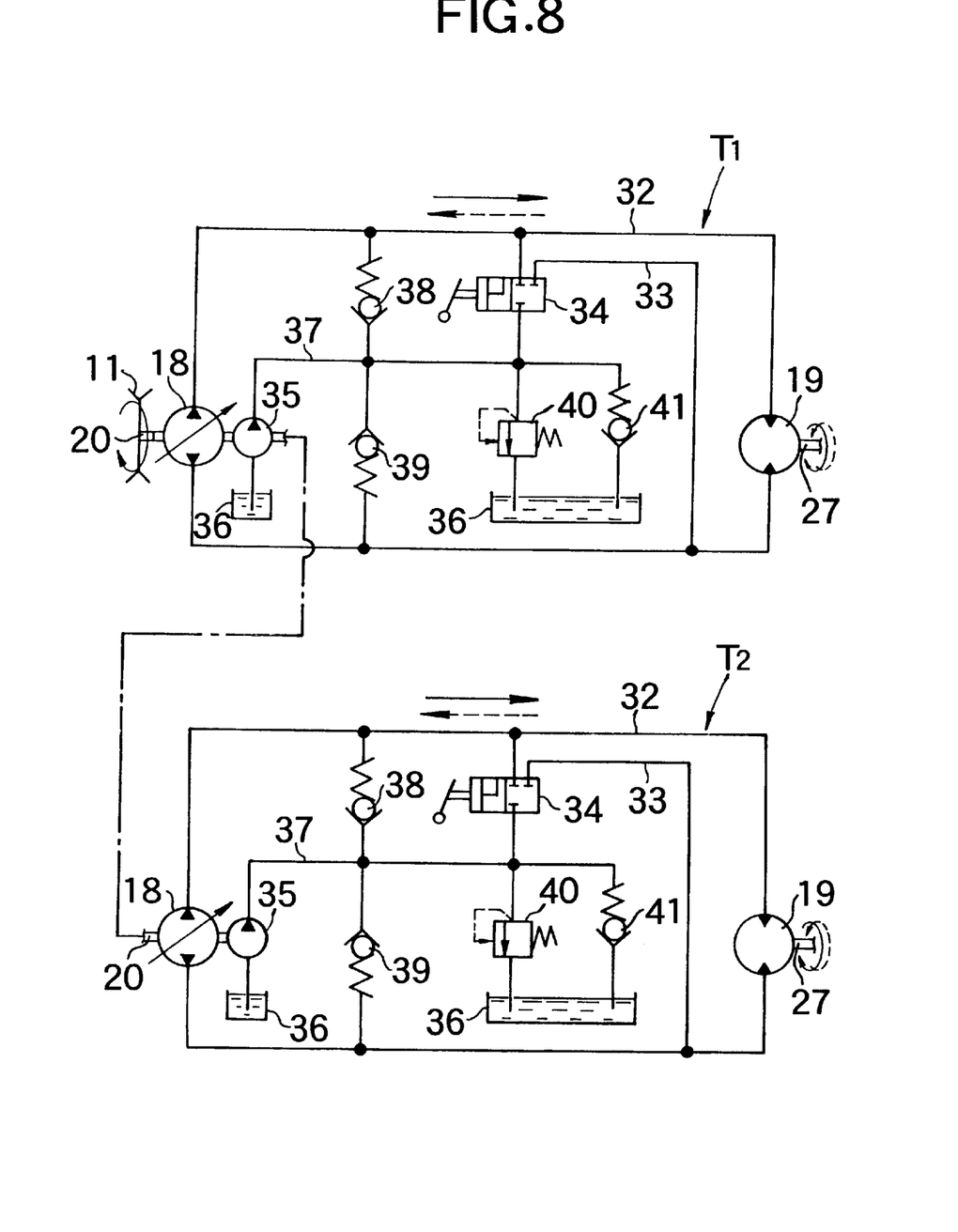
FIG. 8 is a diagram of hydraulic pressure circuits of left and right hydrostatic continuously variable transmissions.

As shown in FIG. 8, the hydraulic pump 18 and the hydraulic motor 19 in each of the continuously variable transmissions $T_1$ and $T_2$ are connected to each other by a closed hydraulic pressure circuit 32. A bypass passage 33 is provided in the closed hydraulic pressure circuit 32 to interconnect a high-pressure zone and a low-pressure zone of the closed hydraulic pressure circuit 32, and a relief valve 40 incorporated in the bypass passage 33, is opened and closed by a manual operation. A working oil supplementing pump 35 is connected to the hydraulic pump 18 and driven by the pump shaft 20 of the hydraulic pump 18. The working oil supplementing pump 35, pumps working oil from an oil reservoir 36 to feed it to oil supply passage 37 which is connected to the high-pressure zone and the low-pressure zone of the closed hydraulic pressure circuit 32 through one-way valves 38, 38, respectively. If required, the oil supply passage 37 may be connected to the oil reservoir 36 through the relief valve 40 and an intake valve 41, which are in a parallel relation to each other.

If the hydraulic pump 18 is driven when the pump swash plate 23 is inclined in a positive direction and the relief valve 40 is in a closed state, the working oil flows in the direction of the arrow shown by a solid line in the closed hydraulic pressure circuit 32. Thus, the motor shaft 27 of the hydraulic motor 19 is rotated in a normal direction with a current ratio of the capacity of the hydraulic pump 18 to the capacity of the hydraulic motor 19 serving as a shift ratio. Conversely, if the pump swash plate 23 is inclined in a negative direction, the working oil flows in a direction of the arrow shown by a dotted line in the closed hydraulic pressure circuit 32, and thus the motor shaft 27 is rotated in the reverse direction. If oil leakage occurs in the closed hydraulic pressure circuit 32 during this time, the one-way valve 38 or 39 corresponding to a current low-pressure zone is opened, thereby permitting the working oil to be supplemented from the working oil supplementing pump 35 to the closed hydraulic pressure circuit 32. When the pressure in the oil supply passage 37 rises to a given value or higher, the relief valve 40 is opened to prevent the excessive rise of pressure in the oil supply passage 37. If the high-pressure zone and the low-pressure zone of the closed hydraulic pressure circuit 32 are abruptly reversed by an engine brake, and the working oil is supplied low to the low-pressure zone by the working oil supplementing pump 35, the intake valve 41 can be opened to draw the oil from the oil reservoir 36 into the low-pressure zone, thereby preventing the drawing of air into the closed hydraulic pressure circuit 32.

Referring again to FIG. 5, the closed hydraulic pressure circuit 32, the working oil supplementing pump 35, the oil supply passage 37, the one-way valve 38, the relief valve 40 and the intake valve 41 are provided in the dispensing plate 16.

The oil reservoir 36 is formed between both of the case halves $14_1$ and $14_2$ of the transmission case 14. An oil filter 42 is mounted inside each of the dispensing plates 16 and immersed in the oil reservoir 36 to cover the intake ports of the working oil supplementing pump 35 and the intake valve 41, so that the working oil supplied to the working oil supplementing pump 35 and the intake valve 41 is filtered.

Each of the pump shafts 20 and each of the motor shafts 27 are disposed in parallel to the output shafts $8_1$, $8_2$. Either one of the left and right pump shafts 20 has an outer end protruding outwards from the housing 17, and is driven by a crankshaft Ea of the engine E through the belt transmitting device 11.

The left and right pump shafts 20, 20 are coaxially connected to each other within the narrower portion 14a by a boss of a first driving gear 45 (a driving member). The left and right motor shafts 27, 27 are coaxially disposed for rotation relative to each other, and second driving gears 46, 46 are secured to the left and right motor shafts 27 within the narrower portion 14a, respectively. In addition, an idle shaft 47 parallel to the motor shaft 27, is supported within the narrower portion 14a. Thus, (1) left and right idle gears 48 and 49 meshed with the second driving gears 46, 46, and (2) a central stepped idle gear 50 which is disposed between the left and right idle gears 48 and 49 with a larger-diameter gear portion 50a thereof meshed with the first driving gear 45 are carried on the idle shaft 47.

Figure 6:
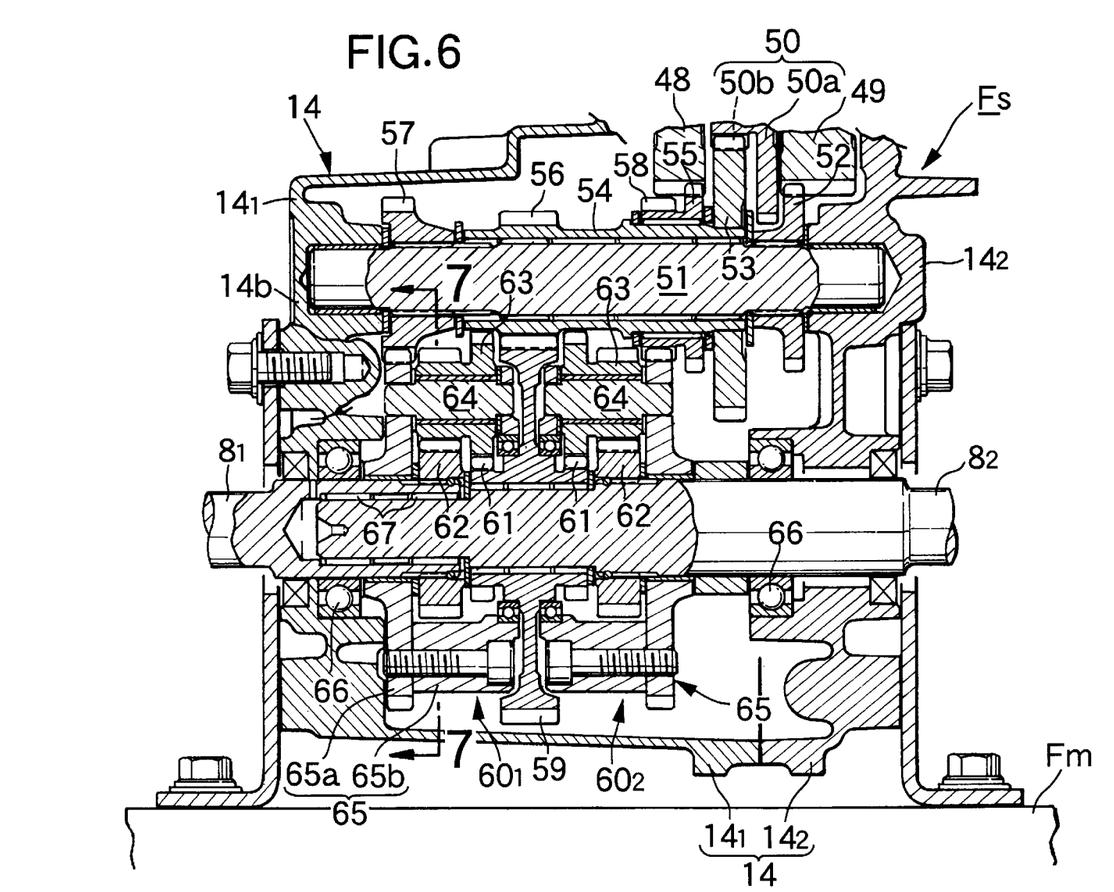
FIG. 6 is a sectional view taken along a line 6—6 in FIG. 4.
Figure 7:
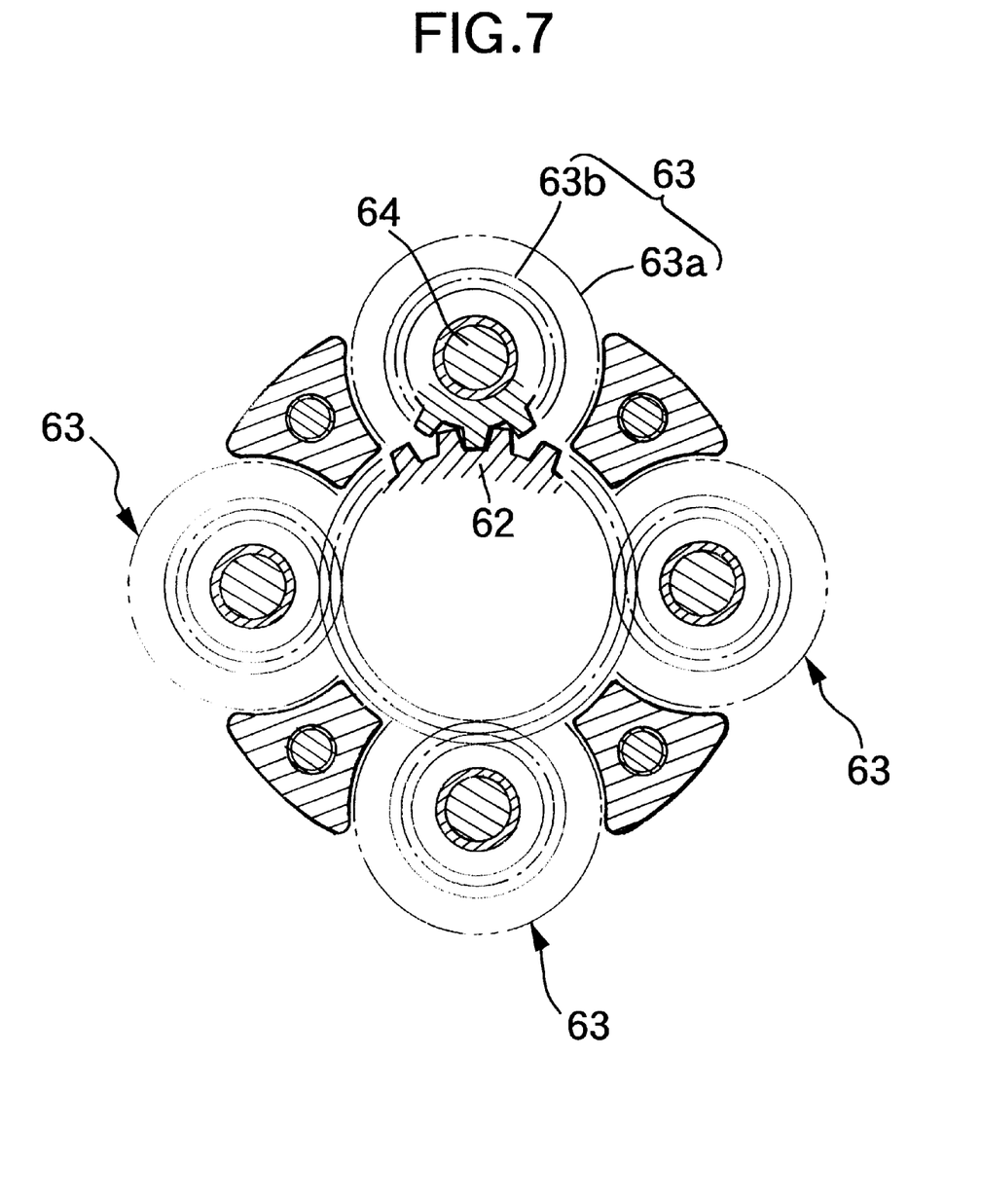
FIG. 7 is a sectional view taken along a line 7—7 in FIG. 6.

Referring to FIGS. 6 and 7, a junction shaft 51 parallel to the idle shaft 47 and the pair of left and right output shafts $8_1$ and $8_2$ are supported in the wider portion 14b of the transmission case 14. A right junction input gear 52 is secured to the junction shaft 51 and meshed with the right idle gear 49. A cylindrical shaft 54 is also rotatably carried on the junction shaft 51 and has, at its right end, a central junction input gear 53 meshed with a smaller-diameter gear portion 50b of the central idle gear 50. A left junction input gear 55 is rotatably carried on the cylindrical shaft 54 and meshed with the left idle gear 48. A central junction output gear 56 is formed at the left end of the cylindrical shaft 54. A left junction output gear 57 is spline-coupled to the left end of the junction shaft 51 and integrally formed in a stepped manner on the right junction input gear 52.

A central driven gear 59 is rotatably carried on the right output shaft $8_2$ and meshed with the central junction output gear 56. The central driven gear 59, the right junction output gear 58 and the right output shaft $8_2$ are connected to one another by a right planetary gear mechanism $60_2$, and the central driven gear 59, the left junction output gear 57 and the left output shaft $8_1$ are connected to one another by a left planetary gear mechanism $60_1$.

The left and right planetary gear mechanism $60_1$ and $60_2$ are formed symmetrically and hence, only the left mechanism $60_1$ will be described. A first sun gear 61 is integrally formed at the left end of a boss of the central driven gear 59, and a second sun gear 62 is spline-coupled to the left output shaft $8_1$. A plurality of two-step planetary gears 63 are meshed with the first and second sun gears 61 and 62 to cover the first and second sun gears 61 and 62. A plurality of support shafts 64 having the planetary gears 63 rotatably carried thereon are supported at one end thereof on a carrier gear 65a rotatably carried on the left output shaft $8_1$ and meshed with the left junction output gear 57, and at the other ends thereof are rotatably supported on a carrier plate 65b rotatably supported on the boss of the central driven gear 59. A carrier 65 comprises the carrier gear 65a and the carrier plate 65b.

The first sun gear 61 of the right planetary gear mechanism $60_2$ is integrally formed at the right end of the boss of the central driven gear 59.

The left and right output shafts $8_1$ and $8_2$ are supported on left and right sidewalls of the wider portion 14b through ball bearings 66, 66, and have opposed ends fitted to each other through a needle bearing 67.

The operation of the embodiment will be described below. If the engine E is operated, so that the power of the engine is transmitted simultaneously to the pump shafts 20, 20 of the left and right continuously variable transmissions $T_1$ and $T_2$ through the belt transmitting device 11, the power is distributed to the left and right hydraulic pumps 18, 18 and the first driving gear 45.

The power distributed to the left and right hydraulic pumps 18, 18 changes the speed in accordance with the angle of the pump swash plate 23 by cooperation of the corresponding hydraulic pumps 18, 18 and the corresponding hydraulic motors 19, 19 and is transmitted to the left and right second driving gears 46, 46. The power transmitted to the left second driving gear 46 is reduced and transmitted to the carrier 65 of the right planetary gear mechanism $60_2$ through the left idle gear 48, the left junction input gear 55 and the right junction output gear 58. The power transmitted to the right second driving gear 46 is reduced and transmitted to the carrier 65 of the left planetary gear mechanism 60₁ through the right idle gear 49, the right junction input gear 52, the junction shaft 51 and the left junction output gear 57.

On the other hand, the power distributed to the first driving gear 45 is reduced and transmitted to the first sun gears 61, 61 of the left and right planetary gear mechanisms 60₁ and 60₂ through the central idle gear 50, the central junction input gear 53, the cylindrical shaft 54, the central junction output gear 56 and the central driven gear 59.

Therefore, in each of the planetary gear mechanisms 60₁ and 60₂, the rotational speed and rotational direction of the second sun gear 62, i.e., of the output shaft 8₁, 8₂ are determined by the rotational states of the first sun gear 61 and the carrier 65 through the two-step planetary gears 63.

The relationship between the angle of the pump swash plate 23 of the continuously shifting-type steering system Ts and the overall speed ratio will be described with reference to FIG. 9.

Figure 9:
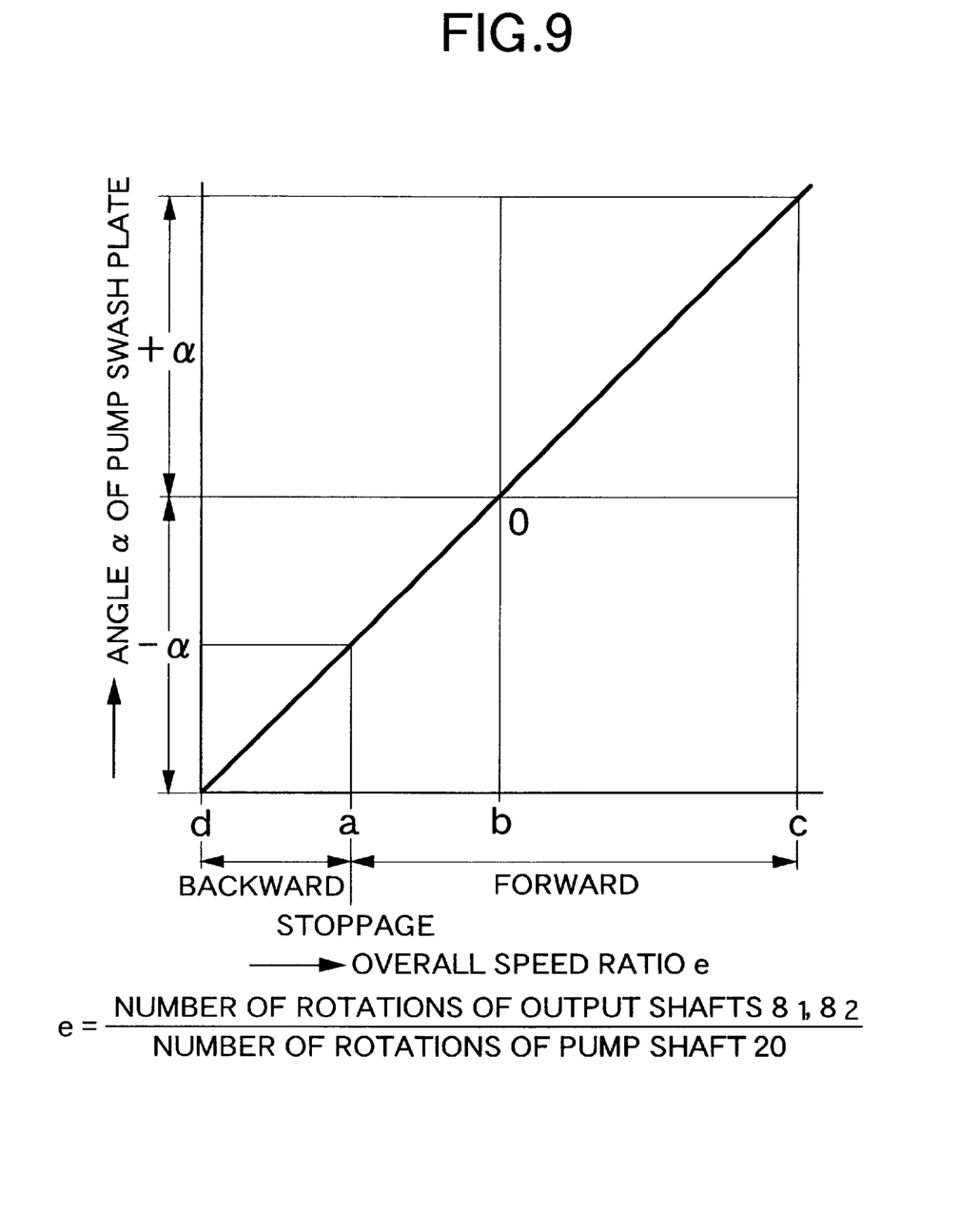
FIG. 9 is a characteristic diagram illustrating the angle of a pump swash plate and the overall speed ratio in the continuously shifting-type steering system.

In the diagram in FIG. 9, the overall speed ratio $\underline{e}$ is on the axis of abscissas, and the angle α of the pump swash plate 23 is on the axis of ordinates.

(1) When the overall speed ratio e=b

This case is when the pump swash plate is at the angle α equal to 0. The capacity of the hydraulic pump 18 is zero by the fact that α=0 and hence, the hydraulic motor 19 is not operated, and the second driving gear 46 is maintained in a stopped state. Therefore, all of the power of the engine E transmitted to the pump shaft 20 is reduced and transmitted via the transmitting line of the first driving gear 45 to the first sun gear 61 of the planetary gear mechanisms 60₁, 60₂ and further reduced and transmitted in a positive direction via the two-step planetary gears 63 to the second sun gear 62 to drive the output shafts 8₁, 8₂ at a low speed in a forward direction.

(2) When the overall speed ratio is in the range e=b to c

If the angle α of the pump swash plate 23 is increased from zero in the positive direction, the hydraulic pump 18 operates the hydraulic motor 19 in the positive direction, so that a portion of the power supplied from the engine E to the pump shaft 20 is transmitted in the positive direction via the hydraulic pump 18 and the hydraulic motor 19 as well as the transmitting line of the second driving gear 46 to the carrier 65 of the planetary gear mechanisms 60₁, 60₂ to drive the support shafts 64 of the two-step planetary gears 63 in the positive direction. Therefore, the rotation in the positive direction from the first sun gear 61 and the rotation in the positive direction from the carrier 65 are applied to the second sun gear 62 and as a result, the overall speed ratio $\underline{e}$ is increased with an increase in the angle α in the positive direction, so that the rotation of the output shafts 8₁, 8₂ is increased in speed.

(3) When the overall speed ratio is in the range e=b to a

If the angle a of the pump swash plate 23 is increased from zero in a negative direction, the hydraulic pump 18 operates the hydraulic motor 19 in a reverse direction, so that a portion of the power supplied from the engine E to the pump shaft 20 is transmitted in the reverse direction via the hydraulic pump 18 and the hydraulic motor 19 as well as the transmitting line of the second driving gear 46 to the carrier 65 of the planetary gear mechanisms 60₁, 60₂ to drive the support shafts 64 of the two-step planetary gears 63 in the reverse direction. Therefore, the rotation in the positive direction from the first sun gear 61 and the rotation in the reverse direction from the carrier 65 are applied to the second sun gear 62 and as a result, the overall speed ratio $\underline{e}$ is decreased with an increase in the angle α in the negative direction and becomes zero at a point $\underline{a}$. This provides a state in which the reduction ratio is infinite, and the rotation of the output shafts 8₁, 8₂ is stopped.

(4) When the overall speed ratio is in the range e=a to d

If the angle α of the pump swash plate 23 is further increased in the negative direction from the point $\underline{a}$, the speed of the rotation applied from the carrier 65 to the second sun gear 62 is higher than the speed of the rotation in the positive direction applied from the first sun gear 61 to the second sun gear 62. Therefore, the overall speed ratio $\underline{e}$ is increased in the negative direction from zero, and the output shafts 8₁ and 8₂ are driven in the backward direction.

In this way, not only the angle of the pump swash plate 23 in the positive direction, but also a portion of the angle in the negative direction contribute to the control of the overall speed ratio in the positive direction and hence, the overall speed ratio in the positive direction can be remarkably increased. This ensures that even if the hydrostatic continuously variable transmissions $T_1$ and $T_2$ are in a low-speed range in which the flowing of the working oil is constricted, so that it is difficult to transmit large power, the large power of the engine E can be mechanically transmitted with high efficiency from the transmitting line of the first driving gear 45 to the output shafts 8₁ and 8₂. Thus, even if small-sized hydrostatic continuously variable transmissions $T_1$ and $T_2$ are used, a high low-speed driving performance can be ensured.

The decrease in transmitting burden on the hydrostatic continuously variable transmissions $T_1$ and $T_2$ brings about a decrease in leakage of the pressure of the working oil in the transmissions $T_1$ and $T_2$, thereby enabling a further enhancement of the transmitting efficiency.

Further, when the overall speed ratio is in the range e=b to a, and in a state in which the output shafts 8₁ and 8₂ are rotated in the forward direction, the motor shaft 27 of each of the hydrostatic continuously variable transmissions $T_1$ and $T_2$ is reversed and hence, the hydraulic motor 19 is driven at an increased speed in the reverse direction due to travel resistance. Namely, the hydraulic motor 19 functions as a pump, and the hydraulic pump 18 functions as a motor, but the load in this case is relatively small. Therefore, the hydraulic pressure generated in the closed hydraulic pressure circuit 32 is lowered more than that in the usual transmission of the hydraulic pressure, and the loss of the power is correspondingly decreased. Thus, the transmitting efficiency in the low-speed range can be further enhanced.

On the other hand, if the steering wheel H is turned rightwards or leftwards during traveling of the vehicle, a difference is provided between the angles of the left and right swash plates 23, 23 in operative association with such turning of the steering wheel H, to produce a rotational difference between the left and right motor shafts 27, 27 and thus between the second driving gears 46, 46, whereby the left and right output shafts 8₁ and 8₂ can be differentially operated to turn the direction of the vehicle to the right or left.

In the case of this embodiment, the left and right planetary gear mechanisms 60₁ and 60₂ do not have large-diameter ring gears and hence, can be small-sized.

Figure 10:
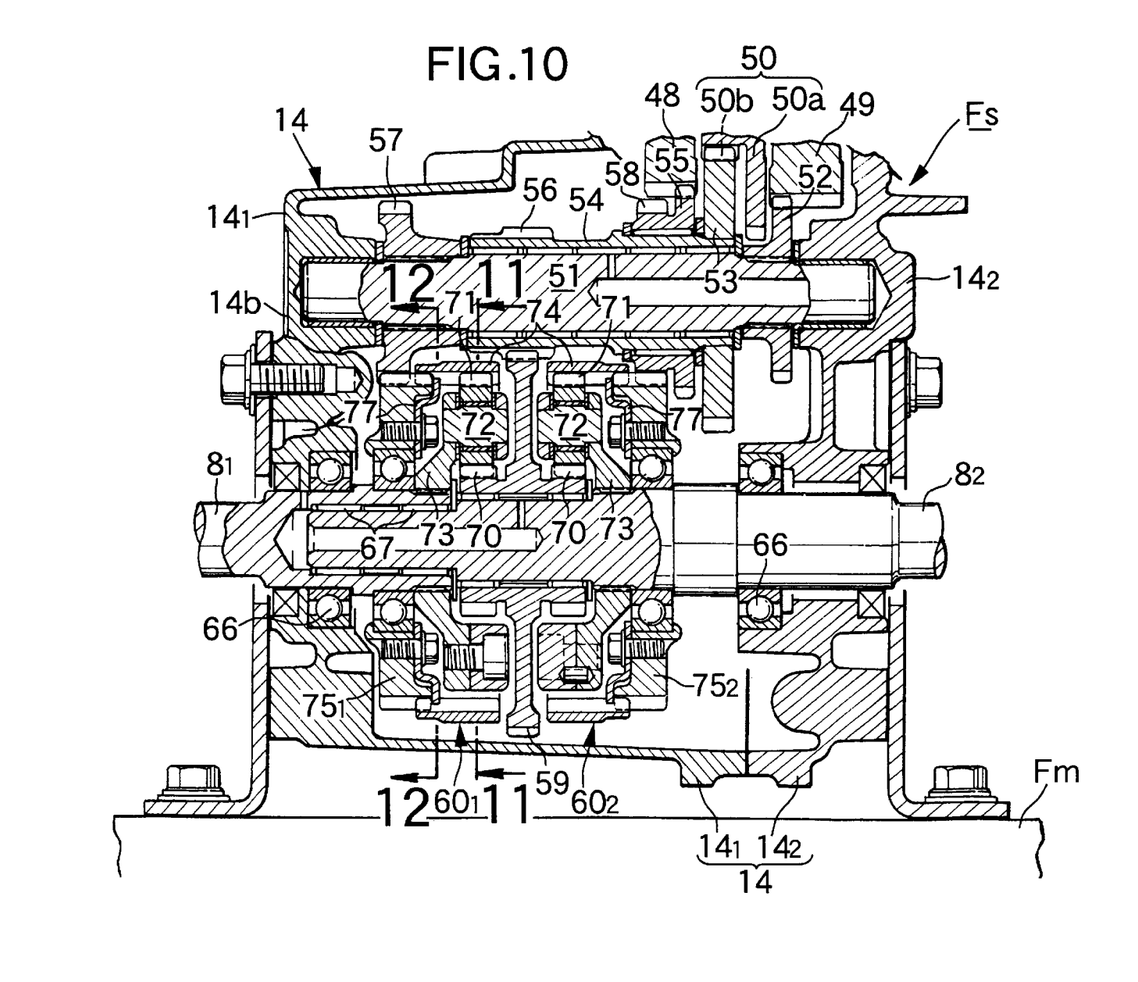
FIG. 10 is a sectional view similar to FIG. 6, but according to a second embodiment of the present invention.
Figure 11:
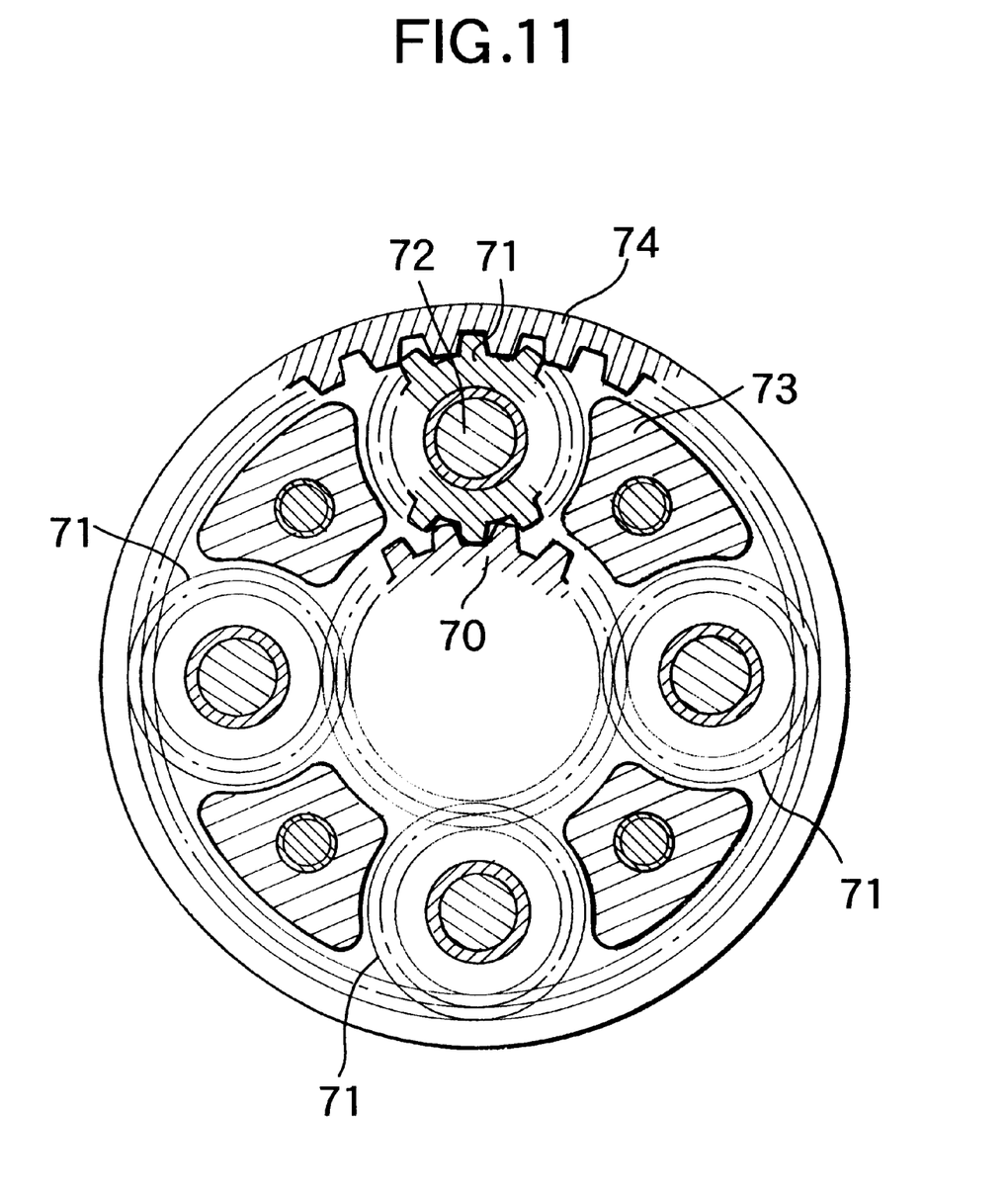
FIG. 11 is a sectional view taken along a line 11—11 in FIG. 10.
Figure 12:
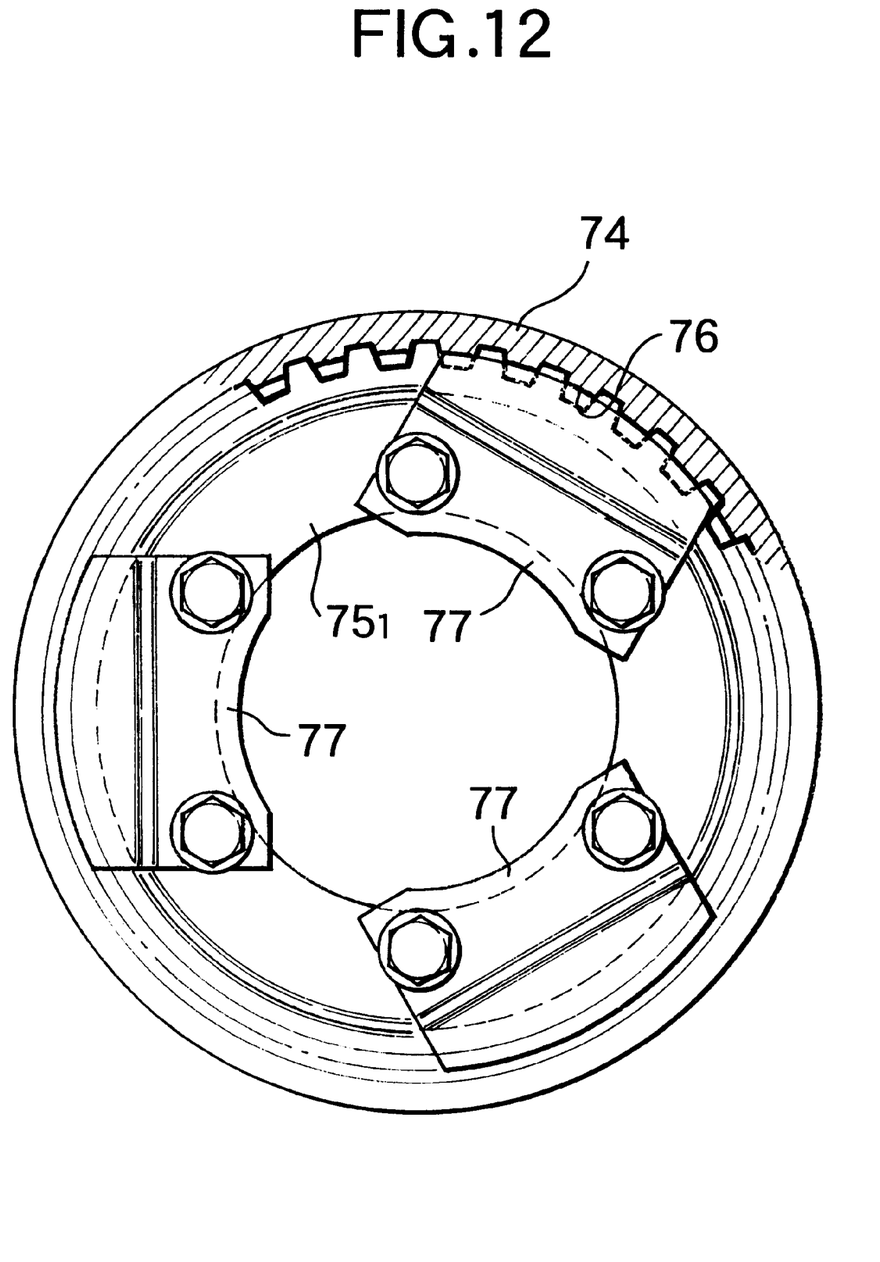
FIG. 12 is a sectional view taken along a line 12—12 in FIG. 10.

FIGS. 10 to 12 illustrate a second embodiment of the present invention, which is different in the arrangement of left and right planetary gear mechanisms 60₁ and 60₂ from the previous embodiment. Even in the second embodiment, the left and right planetary gear mechanisms 60₁ and 60₂ are a laterally symmetric arrangement and hence, only the left mechanism $60_1$ will be described. The left planetary gear mechanism $60_1$ is comprised of a sun gear 70 formed on a boss of the central driven gear 59, a plurality of planetary gears 71 meshed with the sun gear 70 surrounding the sun gear 70, a carrier 73 which is spline-coupled to the left output shaft $8_1$ while supporting support shafts 72 of the planetary gears 71, and a ring gear 74 meshed with the plurality of planetary gears 71 to surround the planetary gears 71. A left driven gear $75_1$, which is rotatably carried on the left output shaft $8_1$ and meshed with the left junction output gear 57, is coaxially coupled to and meshed with the ring gear 74. In this case, in order to limit the axial movement of the ring gear 74, a plurality of retainer plates 77 bolted to the left driven gear $75_1$, are engaged into an annular groove 76 defined in an inner periphery of the ring gear 74. The other construction is similar to that in the previous embodiment and hence, in FIGS. 10 to 12, portions or components corresponding to those in the previous embodiment are designated by like reference characters.

A right driven gear $75_2$ is rotatably carried on the right output shaft $8_2$ and coupled to a ring gear 74 of the right planetary gear mechanism $60_2$.

In this embodiment, the large-diameter ring gear 74 is included, but the sun gear 70 may be single, and the planetary gear 71 may be of a simple, one-step type. Therefore, the axial dimension of the planetary gear mechanisms $60_1$ and $60_2$ can be reduced even more than that in the previous embodiment.

Figure 13:
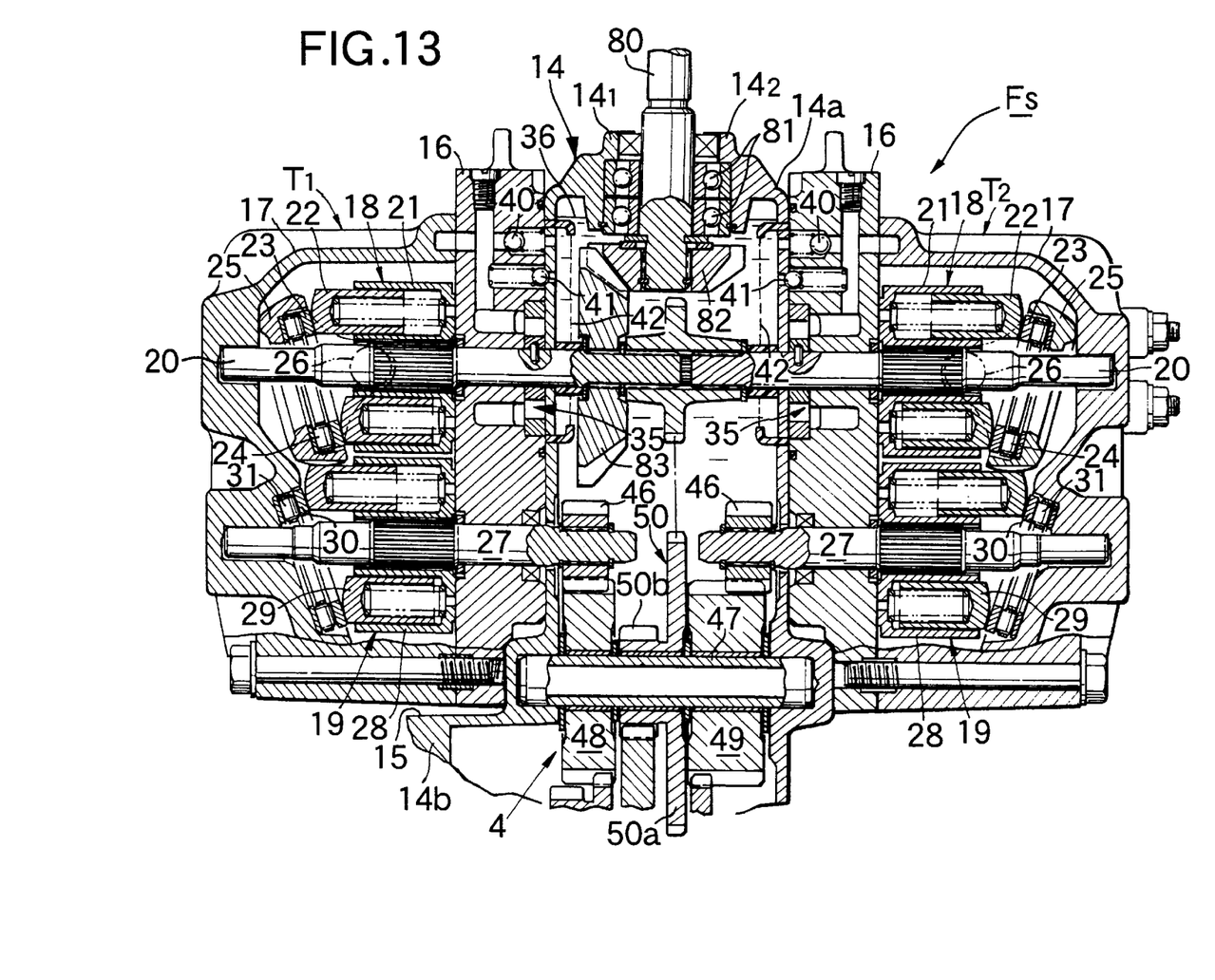
FIG. 13 is a sectional view similar to FIG. 5, but according to a third embodiment of the present invention.

FIG. 13 illustrates a third embodiment of the present invention. In this embodiment, an input shaft 80 driven by the engine E, is supported on an upper wall of the narrower portion 14a of the transmission case 14 through a bearing 81, and a pair of bevel gears 82 and 83 meshed with each other within the narrower portion 14a, are spline-coupled to the input shaft 80 and one of the pump shafts 20. The other construction is similar to that in the first embodiment and hence, in FIG. 13, portions or components corresponding to those in the first embodiment are designated by like reference characters.

Although the embodiments of the present invention have been described in detail, it will be understood that the present invention is not limited to the above-described embodiments, and various embodiments may be made without departing from the spirit and scope of the invention defined in claims.

What is claimed is:

1. A continuously shifting steering system powered by an engine, said steering system comprising:

(a) a pair of left and right hydrostatic continuously variable transmissions each said transmission comprising a closed hydraulic circuit, a hydraulic motor having an output shaft and a hydraulic pump having an input shaft, wherein said input shafts of said pumps of said right and left transmissions are synchronously driven by the engine;

(b) right and left driving wheels;

(c) right and left output shafts connected to said right and left driving wheels, wherein said output shafts are respectively driven by the output shafts of said right and left motors, wherein each said hydraulic pump has a pump swash plate which is tiltable between a forward TOP position which is a maximum tilted position in a positive direction and a backward TOP position which is a maximum tilted position in a negative direction via a neutral position perpendicular to said pump shaft, and said output shaft of said hydraulic motor is rotated in a normal direction when said pump swash plate is tilted in said positive direction while said output shaft of the hydraulic motor is rotated in a reverse direction when said pump swash plate is titled in said negative direction;

wherein an overall speed ratio of each said output shaft with respect to said pump shaft is deceased in said positive direction in response to a tilting angle of said pump swash plate increasing from zero in said negative direction, and said overall speed ratio becomes zero when said tilting angle becomes a predetermined value in the negative direction, and said overall speed ratio increases in the negative direction in response to said tilting angle further increasing in said negative direction from said predetermined value;

(d) a pair of right and left planetary gear mechanisms each having first, second and third elements; and (e) a driving member connected to the engine and connected to said first elements of said planetary gear mechanisms for transmitting power from the engine to said first elements;

wherein said left and right motor shafts are operably connected to said second elements of said corresponding planetary gear mechanisms for transmitting power thereto, and said left and right output shafts are operably connected to said third elements of said corresponding planetary gear mechanisms, wherein each of said left and right planetary gear mechanisms is composed of a first sun gear, a two-step planetary gear having one of gear sections thereof meshed with said first sun gear, a second sun gear disposed coaxially with said first sun gear and meshed with the other gear section of said two-step planetary gear, and a carrier for carrying a support shaft of said two-step planetary gear, and wherein said driving member is operably connected commonly to said left and right first sun gears, said output shafts of said hydraulic motors are operably connected to said left and right carriers, respectively, and said left and right output shafts are operably connected to said left and right second sun gears, respectively.

2. A continuously shifting steering system according to claim 1, wherein said pair of right and left hydrostatic continuously variable transmissions are respectively mounted on right and left sides of an upper portion of a transmission case, said pair of right and left planetary gear mechanisms are provided within a lower portion of said transmission case, and said driving member is coaxially connected to said pump shaft of said right and left hydraulic pumps within the upper portion of said transmission case.

3. A continuously shifting steering system according to claim 1, wherein said right and left first sun gears are formed at right and left ends of a central driven gear operably connected to said driving member, said two-step planetary gear is meshed with said first and second sun gears so as to enclose said first and second sun gears, and said right and left carriers are rotatably supported on said right and left output shafts, respectively.

\* \* \* \* \*